J. E. HUTCHINS.
WATERING TROUGH.
APPLICATION FILED JAN. 18, 1912.
1,033,018.  Patented July 16, 1912.
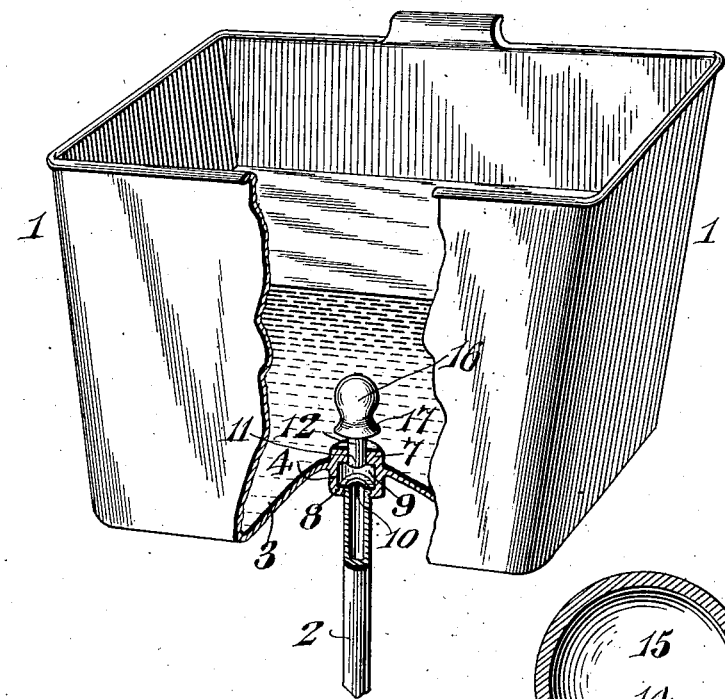
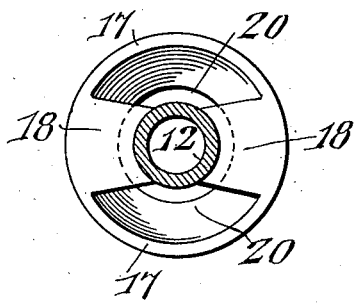
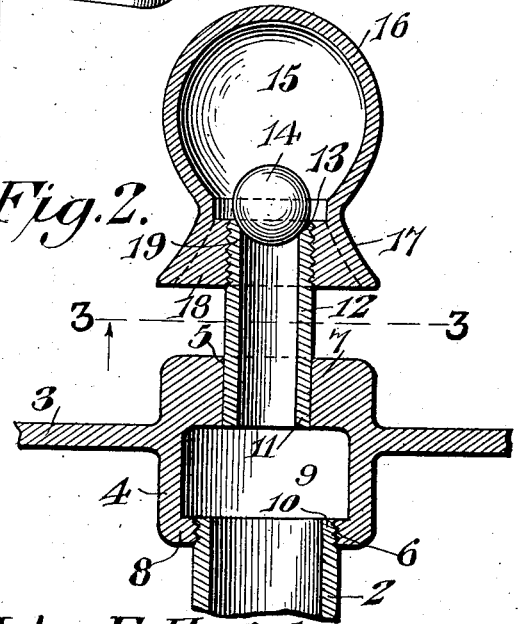
WITNESSES  John E. Hutchins, INVENTOR
BY
ATTORNEY

UNITED STATES PATENT OFFICE.

JOHN E. HUTCHINS, OF MIDDLETOWN, CONNECTICUT.

WATERING-TROUGH.

1,033,018.  Specification of Letters Patent.  Patented July 16, 1912.

Application filed January 18, 1912. Serial No. 671,812.

*To all whom it may concern:*

Be it known that I, JOHN E. HUTCHINS, a citizen of the United States, residing at Middletown, in the county of Middlesex and State of Connecticut, have invented a new and useful Watering-Trough, of which the following is a specification.

The invention relates to improvements in watering troughs.

The object of the present invention is to improve the construction of watering troughs of that class in which a plurality of separate independent troughs are connected with and automatically fed from a tank or other source of supply, and to provide a trough equipped with a simple, inexpensive and efficient automatically operative valve, adapted to permit the independent operation of such troughs, and capable of effectually preventing backward flow of water from the trough, so that when water is consumed in one trough it will not affect the level or otherwise affect the water contained in another trough, whereby the troughs are maintained in a sanitary condition, and cattle drinking from one trough prevented from infecting water in other troughs, as would be the case were the water permitted to flow from one trough to another.

A further object of the invention is to provide a valve of this character having a protecting hood, which will shield the valve from the nose of an animal and which will not injure the same.

With these and other objects in view, the invention consists in the construction and novel combination of parts hereinafter fully illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a perspective view, partly in section, of a tank provided with an automatic valve, constructed in accordance with this invention. Fig. 2 is an enlarged vertical sectional view of the automatic valve and a portion of the bottom of the trough. Fig. 3 is a horizontal sectional view on the line 3—3 of Fig. 2.

Like numerals of reference designate corresponding parts in all the figures of the drawing.

In the accompanying drawing in which is illustrated the preferred embodiment of the invention, 1 designates a watering trough, designed in practice to be arranged in a series and to be connected by a supply pipe 2 with a common source of supply, such as a tank in which water is automatically maintained at a predetermined level by a float controlled valve. As this construction is common in the art, illustration thereof is deemed unnecessary. The trough 1, which is preferably constructed of metal, is provided at the bottom 3 with an integral cylindrical casing 4, projecting upwardly and downwardly from the metallic bottom 3 and having openings 5 and 6, formed in its top and bottom walls 7 and 8. The cylindrical casing has an interiorly arranged chamber 9, and its top wall is preferably of greater thickness than its lower end wall 8, as clearly illustrated in Fig. 2 of the drawing. In tapping the bottom wall for the supply pipe 2, the chamber 9 is adapted to permit the tap, or other tool to extend into it so that the lower opening 6 may be fully tapped. The opening 5 in the upper end wall or top 7 receives the lower end 11 of a short vertical pipe 12, which is preferably cast in the said wall 7 to reduce the cost of construction to a minimum, but the short vertical pipe 12 may be connected with the casing in any other desired manner.

In casting the pipe 12 in the casing, the said pipe 12 is placed in the mold, and when the metal is poured, it flows around the lower end of the pipe, which is securely held in place when the metal cools.

The upper wall 7 is made relatively thick in order to afford a substantial support for the pipe 12 and make it firm. The pipe 12 extends upwardly from the top of the cylindrical casing 4 and is provided at its upper end with a valve seat 13, formed by beveling the upper end of the short vertical pipe 12 to fit a loose ball 14, constructed of metal, or other suitable material and having sufficient weight to maintain itself firmly on the valve when there is not sufficient pressure exteriorly of the trough to open the valve.

The valve operates within a substantially spherical chamber 15 of an approximately spherical hollow hood 16, open at the bottom and provided thereat with a downwardly and outwardly flared flange or extension 17. The spherical body portion of the hollow hood extends upward from and surrounds the valve seat, and the interior chamber of the hood presents continuous curved faces to the loose ball and is adapted to cause the same to seat itself automatically and effectually prevents the ball from finding lodgment at any point other than on the valve seat. The downwardly and outwardly flared flange or extension projects below the valve seat and is provided at its inner face with opposite integral lugs 18, extending inwardly from the flange 17 and spaced apart and having curved faces at their inner ends provided with threads to engage the threaded upper end 19 of the short vertical pipe 12, whereby the hood is securely fastened to the vertical pipe and supported in position over the valve seat. The open spaces 20 at the side faces or edges of the lugs form outlets for the water to permit the same to flow from the supply pipe through the short vertical pipe 12 and through the hood into the trough. The lower supply pipe 2 is of greater diameter than the short vertical pipe 12, and the water on leaving the pipe 2 and entering the pipe 12 will have its pressure increased. The pressure is increased in this manner for the purpose of enabling the trough or bucket to be filled more quickly and to insure a uniform working of the valve, the increased pressure being a safe and precautionary measure to produce a positive lifting of the ball by the water.

In practice the level of the water within the trough is the same as that within the tank, which supplies a series of troughs with water, which enters the trough at the bottom. When a cow, or other animal drinks, the water in the trough is lowered and the pressure of the water within the supply tank opens the valve and the water continues to flow into the trough until it reaches the level of the water within the tank; then the pressure ceases and the loose ball of the valve drops of its own weight and seats itself on the upper end of the short vertical pipe 12 and tightly closes the same. The trough can be emptied then only by taking the water out from the top. The trough operates automatically and independently of other troughs, and if a diseased cow should drink from one trough of a system, the valve will prevent any germs contained in that trough from being conveyed to and infecting the water contained in the other troughs of the series. The hood will prevent the nose of an animal from interfering with the automatic operation of the valve, and as the hood presents a smooth spherical exterior, there is no liability of the nose of an animal being injured through contact with the hood.

The distance between the bottom of the trough and the top of the valve is one and three fourths inches, but it may, of course, be varied as desired. By having the valve located this distance above the bottom of the trough there can be a considerable deposit or accumulation of food at the bottom of the trough without its interfering with the operation of the valve. In actual use more or less food matter will drop from the mouth of a cow and lie at the bottom of the trough. It will, therefore, be necessary to clean out the trough from time to time, but with such a distance as one and three fourths inches from the top of the valve to the bottom of the trough, it will in ordinary cases be possible to use the trough for some time without such a cleaning being necessary. By preventing backward flow of water from the trough, the spread of tuberculosis among cows through infected drinking water is prevented.

What is claimed is:—

1. The combination of a trough provided at the bottom with a casing having top and bottom openings, the lower opening being adapted to receive a supply pipe, a short vertical pipe mounted upon the said casing at the top opening thereof and having its upper end threaded and provided with a valve seat, a loose ball arranged upon the valve seat, a substantially spherical hollow hood open at the bottom to receive the upper end of the vertical pipe and forming a substantially spherical valve chamber, which receives the loose ball and presents continuous curved faces to the same for automatically seating the ball, said hood being provided at the open bottom with a downwardly and outwardly flared flange spaced from the upper end of the short vertical pipe, and opposite lugs formed integral with the depending flange and extending inwardly from the inner face of the same and spaced apart and having curved inner faces provided with threads engaging the threads of the upper end of the vertical pipe, the spaces at the side faces of the lugs forming outlets for the water.

2. The combination of a trough provided at the bottom with a casing extending above and below the bottom of the trough, the upper wall of the casing being thicker than the lower wall and the latter being provided with a threaded opening to receive a supply pipe, a short vertical pipe cast in the thick upper wall of the casing and having a threaded upper end and provided with a valve seat, a valve coöperating with the seat, a hollow hood open at the bottom to receive the upper end of the vertical pipe and provided at the open bottom with opposite lugs extending inwardly and spaced apart and having threads to engage the threads of the said short vertical pipe, the space at the side faces of the lugs forming outlets for the water.

In testimony, that I claim the foregoing as my own, I have hereto affixed my signature in the presence of two witnesses.

JOHN E. HUTCHINS.

Witnesses:
M. E. SCHULTZ,
G. A. OVERHYSSER.

Copies of this patent may be obtained for five cents each, by addressing the "Commissioner of Patents, Washington, D. C."